(12) United States Patent
Parlow et al.

(10) Patent No.: US 10,071,691 B2
(45) Date of Patent: *Sep. 11, 2018

(54) COMBINED CUP HOLDER AND STORAGE BIN

(71) Applicant: FORD GLOBAL TECHNOLOGIES, LLC, Dearborn, MI (US)

(72) Inventors: Kathleen M. Parlow, Columbus, MI (US); Nicholas Alphonse Billardello, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/296,635

(22) Filed: Oct. 18, 2016

(65) Prior Publication Data

US 2017/0043725 A1   Feb. 16, 2017

Related U.S. Application Data

(63) Continuation of application No. 14/614,471, filed on Feb. 5, 2015, now Pat. No. 9,561,746.

(51) Int. Cl.
*B60R 7/04* (2006.01)
*B60N 3/10* (2006.01)

(52) U.S. Cl.
CPC ............... *B60R 7/043* (2013.01); *B60N 3/10* (2013.01); *B60N 3/102* (2013.01); *B60R 7/04* (2013.01)

(58) Field of Classification Search
CPC ... B60R 2011/0007; B60R 3/102; B60R 3/10; B60N 7/04; B60N 7/043
USPC .............................................. 296/37.8, 24.34
See application file for complete search history.

(56) References Cited

U.S. PATENT DOCUMENTS

| | | | |
|---|---|---|---|
| 4,568,117 | A | 2/1986 | McElfish et al. |
| 5,823,599 | A | 10/1998 | Gray |
| 6,431,391 | B1 | 8/2002 | Kaupp |
| 6,547,326 | B1 | 4/2003 | Walkinshaw et al. |
| 7,008,013 | B2 | 3/2006 | Okamoto |
| 7,111,883 | B1 | 9/2006 | Patel et al. |
| 2011/0259906 | A1 | 10/2011 | Shimajiri |

FOREIGN PATENT DOCUMENTS

| | | |
|---|---|---|
| EP | 2033843 A2 | 3/2009 |
| WO | 2013000763 A1 | 1/2013 |

OTHER PUBLICATIONS

English Machine Translation of EP2033843A2.
English Machine Translation of WO2013000763A1.
Non-Final Rejection dated Mar. 2, 2016 for U.S. Appl. No. 14/614,471.

*Primary Examiner* — Joseph Pape
(74) *Attorney, Agent, or Firm* — Vichit Chea King & Schickli, PLLC

(57) ABSTRACT

A combined cup holder and storage bin is provided. Such a device includes a rotating body having a first feature, a second feature and a third feature. The rotating body is selectively displaceable into a first position orienting the first feature for use, a second position orienting the second feature for use and a third position orienting the third feature for use.

17 Claims, 9 Drawing Sheets

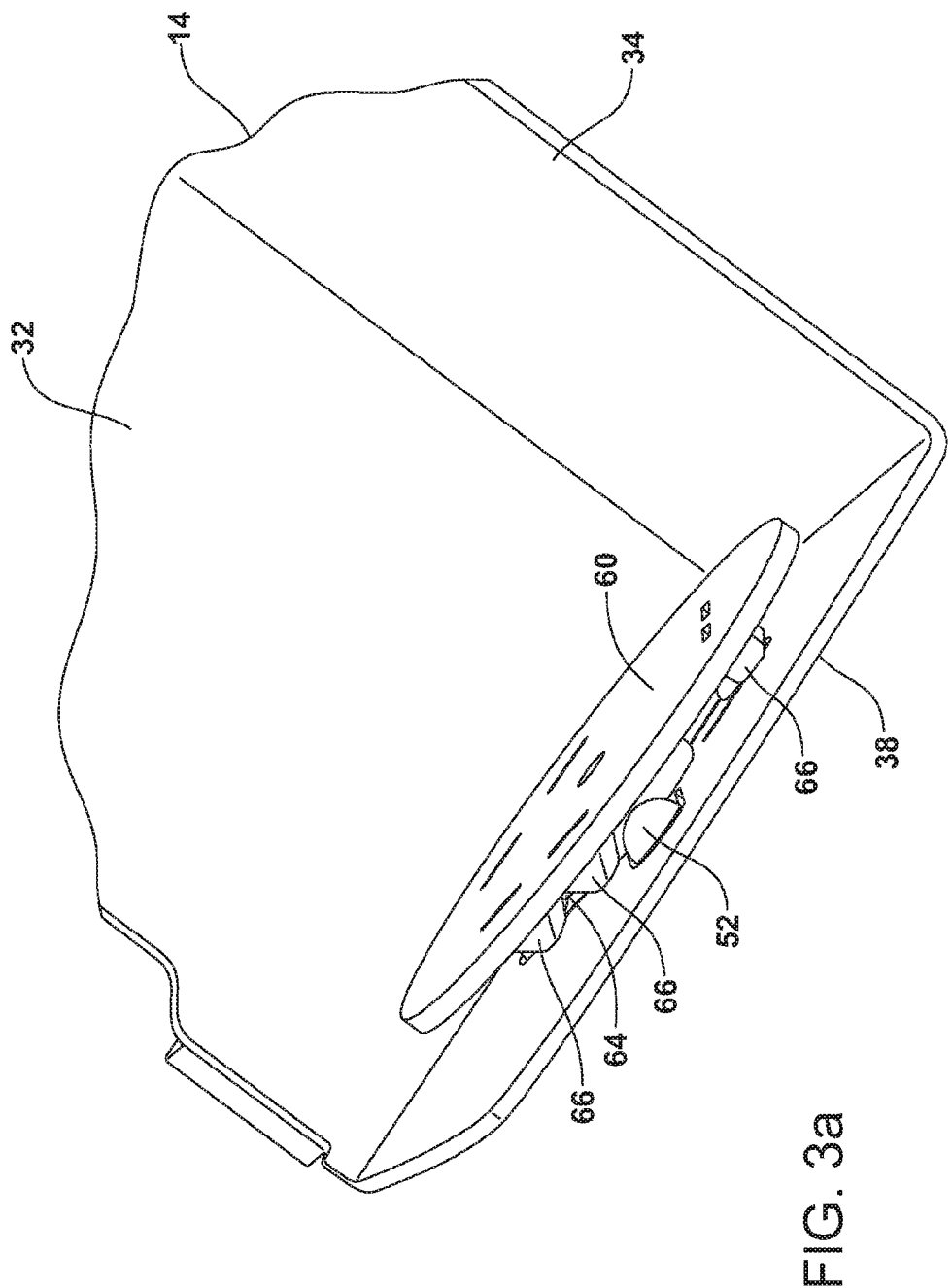

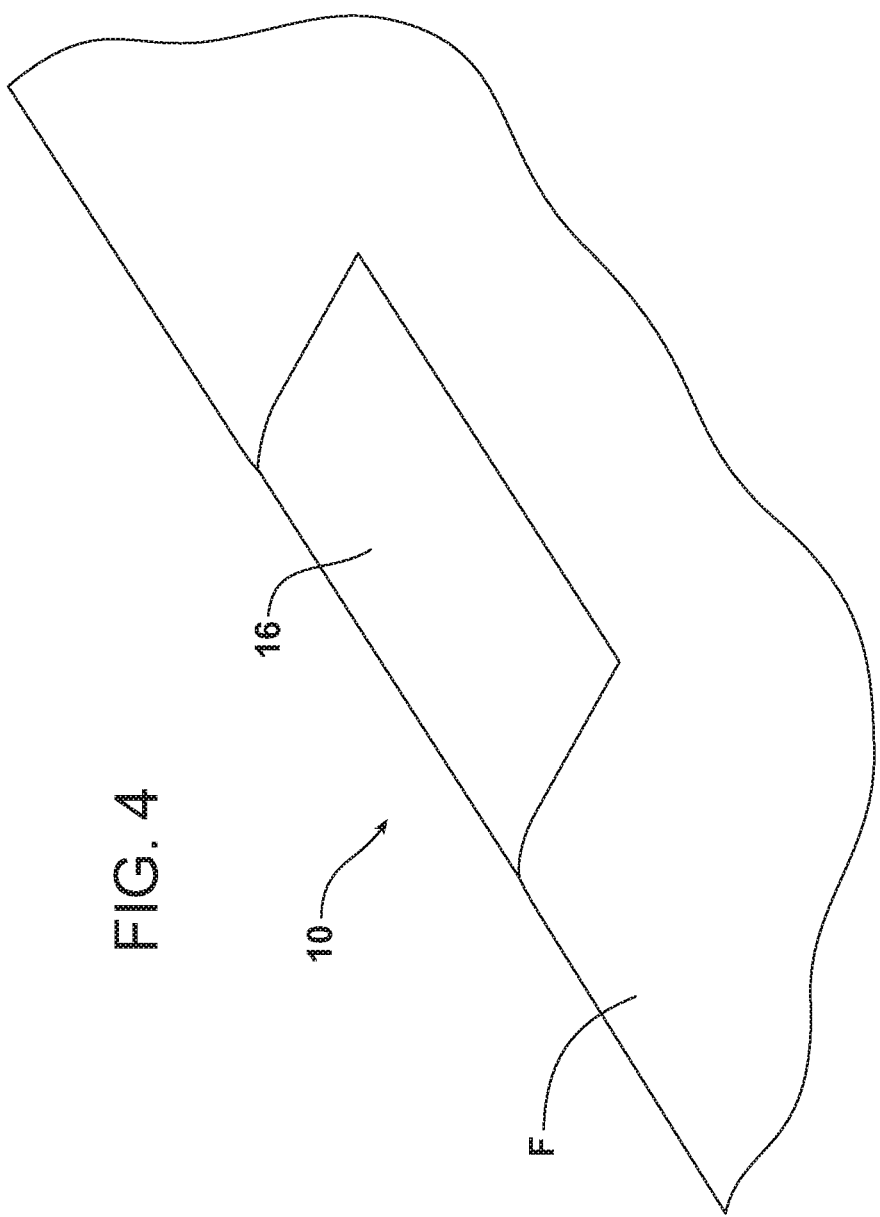

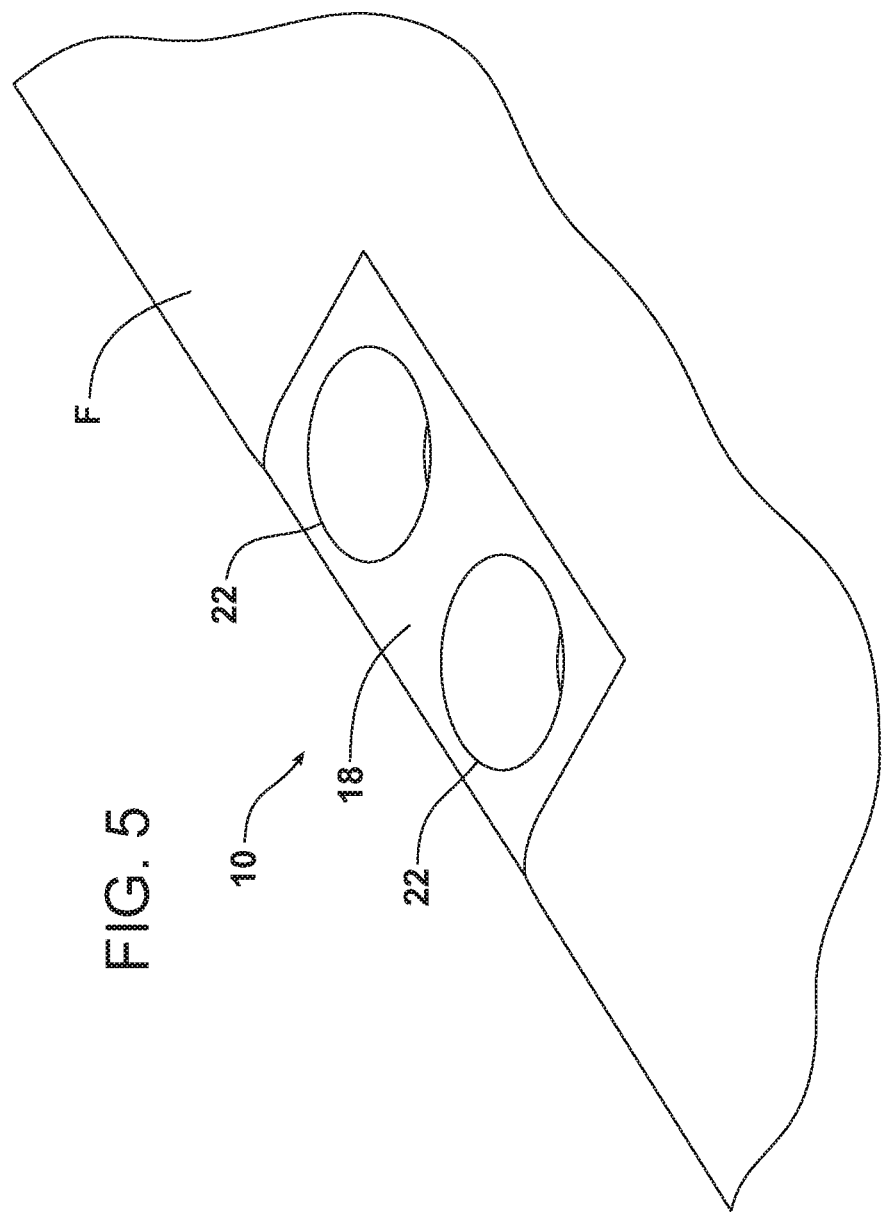

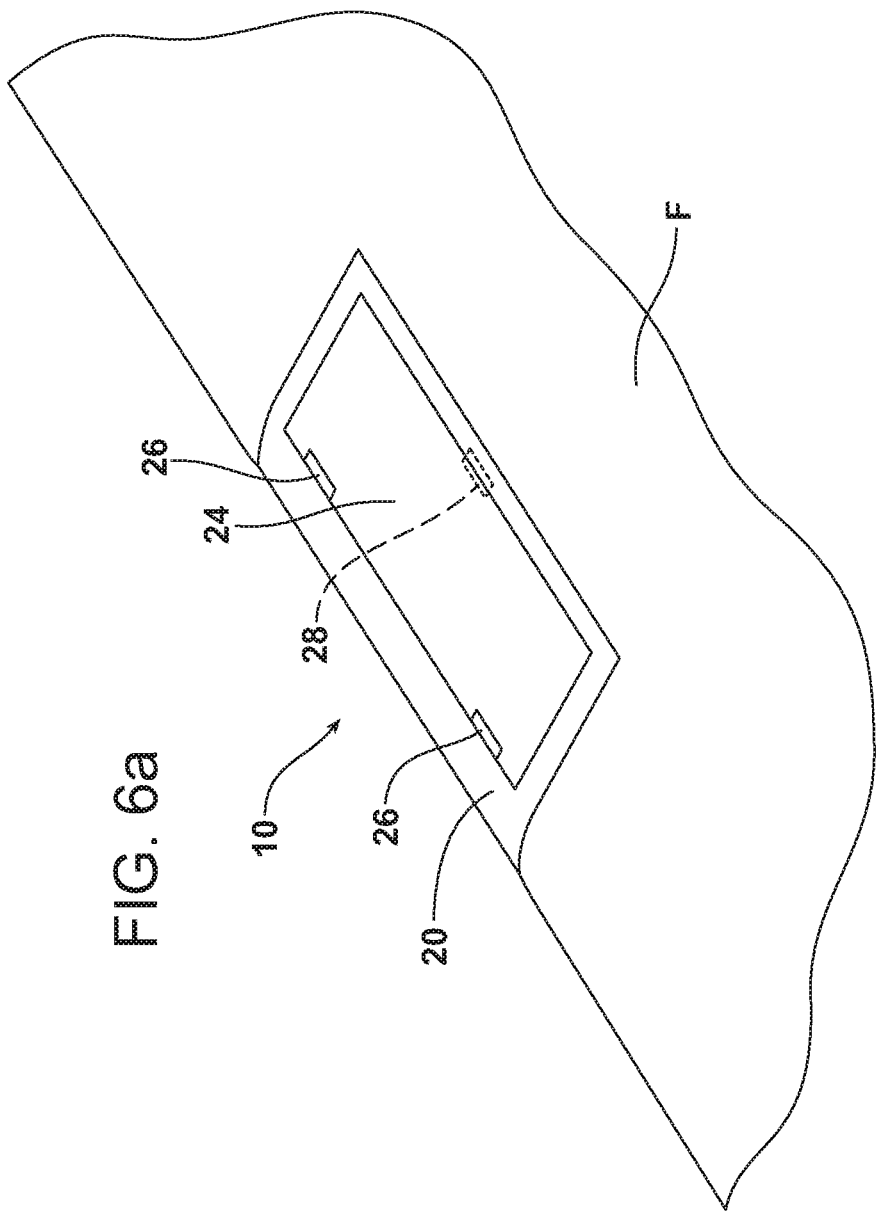

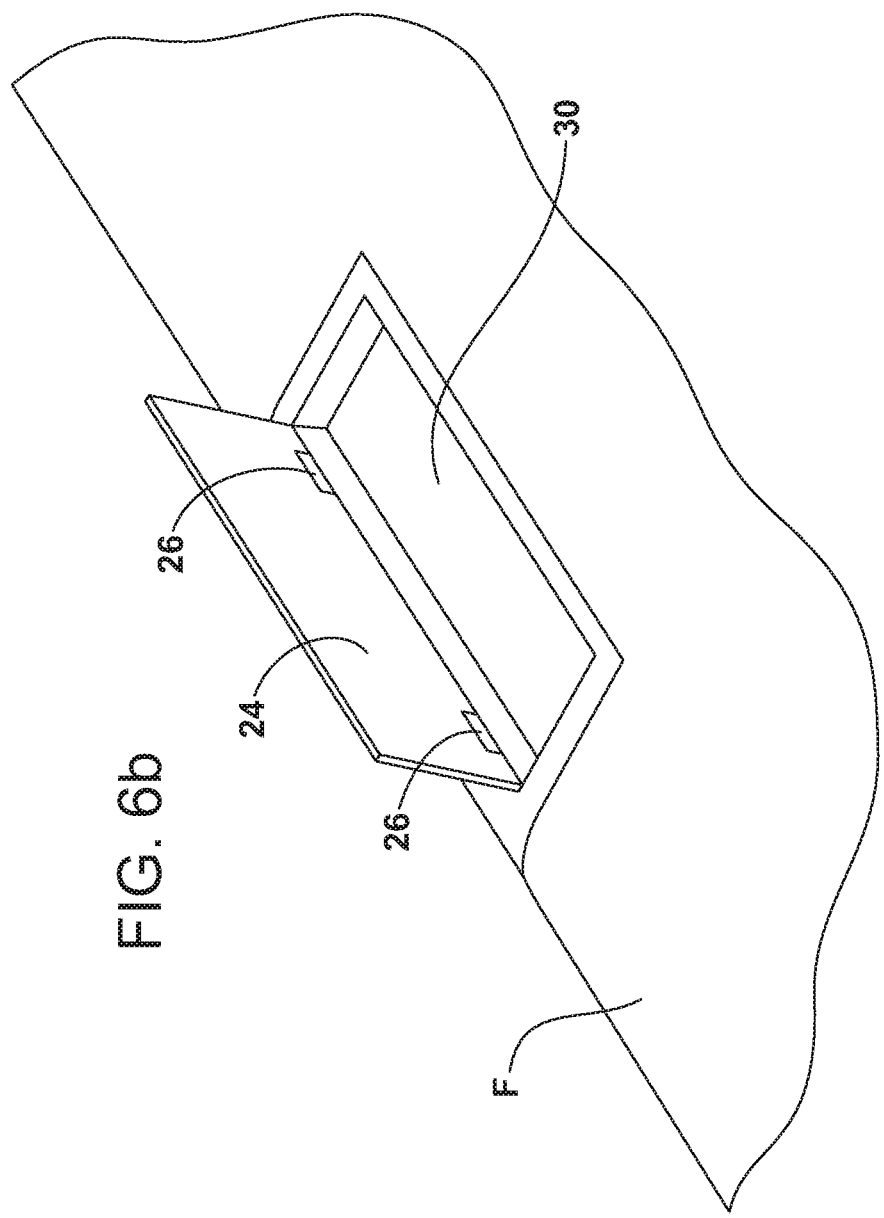

ically high US 10,071,691 B2

COMBINED CUP HOLDER AND STORAGE BIN

This application is a continuation of U.S. patent application Ser. No. 14/614,471, now U.S. Pat. No. 9,561,746, filed on Feb. 5, 2015.

TECHNICAL FIELD

This document relates generally to the motor vehicle equipment field and, more particularly, to a combined cup holder and storage bin including a rotating body that may be selectively displaced in order to orient one of three desired features for easy access and use by a vehicle occupant.

BACKGROUND

Motor vehicle users are always looking for convenient places to store and hold personal items such as wallets, cell phones, electronics, flashlights, sports equipment such as golf balls, suntan lotion, eye drops and the like. In many cases the typical storage options designed into motor vehicles, including, for example, glove boxes, console bins, console cup holders, instrument panel storage compartments, center stack storage compartments, door map pockets, seatback pockets and the like either do not provide enough dedicated storage or are simply not versatile enough to provide the best possible option. Further, these dedicated storage options are typically fixed and non-configurable to best meet the needs of the user. Further, most are focused upon storage within reach of the driver or front row passenger and are not conveniently available to rear seat occupants. As a result it is clear that a need exists for additional storage options in the interior trim of a motor vehicle.

This document relates to a rotating cup holder and storage bin which provides outboard, second row seat occupants with either a cup holder or a storage bin that is within easy reach. When not in use, the device may be rotated to form a part of the middle seat cushion.

SUMMARY

In accordance with the purposes and benefits described herein, a combined cup holder and storage bin is provided. That device comprises a rotating body including a first feature, a second feature and a third feature. The rotating body is selectively displaceable into a first position in order to orient the first feature for use, a second position in order to orient the second feature for use and a third position in order to orient the third feature for use.

The body of the combined cup holder and storage bin includes a pivot axis. The first, second and third features are radially oriented about that pivot axis so as to be upwardly facing when the body is positioned in the respective first, second and third positions.

In one possible embodiment, the combined cup holder and storage bin includes a support base that is fixed to a motor vehicle component such as the rear seat frame, the motor vehicle frame or an interior component such as a console. The body rotates in the support base.

In one possible embodiment, a detent mechanism is provided for retaining the body in the first, second and third positions. The detent mechanism may comprise cooperating resilient projections and cooperating projection receivers. In one possible embodiment, the resilient projections are provided on the support base. Further the resilient projections may be integrally molded with the support base.

In one possible embodiment, the first feature comprises a portion of a seat cushion. In one possible embodiment, the second feature comprises a cup holder. In one possible embodiment, the third feature comprises a storage bin. In one possible embodiment, the storage bin has a lid to hold objects in the storage bin as the body is rotated between the first, second and third positions. In one possible embodiment, the support base is U-shaped in profile so as to form a trunnion mount for the rotating body.

In the following description, there are shown and described several preferred embodiments of the combined cup holder and storage bin. As it should be realized, the combined cup holder and storage bin is capable of other, different embodiments and its several details are capable of modification in various, obvious aspects all without departing from the combined cup holder and storage bin as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the combined cup holder and storage bin and together with the description serve to explain certain principles thereof. In the drawing figures:

FIG. 3a is a detailed perspective view illustrating the detent mechanism when the rotating body (not shown) is between use positions.

FIG. 4 is a perspective view illustrating the rotating body in a first use position wherein a seat portion is oriented up to form a continuous seating surface with the rest of the rear seat.

FIG. 5 is a perspective view illustrating the rotating body in a second use position with cup holders oriented up for use.

FIGS. 6a and 6b are perspective views illustrating the rotating body in a third use position with a storage compartment oriented up for use wherein FIG. 6a shows the lid closed and FIG. 6b shows the lid open.

Reference will now be made in detail to the present preferred embodiments of the combined cup holder and storage bin, examples of which are illustrated in the accompanying drawing figures.

DETAILED DESCRIPTION

Reference is now made to FIGS. 1-6b illustrating the combined cup holder and storage bin 10 that may, for example, be secured to the middle section of the rear seat F of the motor vehicle. The combined cup holder and storage bin 10 comprises a rotating body 12 received for relative rotation in a support base 14 that is fixed to a motor vehicle component such as the rear seat F, or body of the motor vehicle.

Figure 7A:
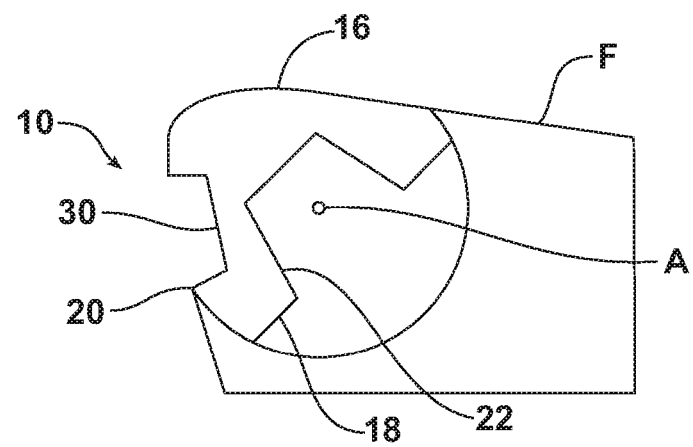
FIGS. 7a-7c are schematic cross sectional views illustrating the rotating body in respective first, second and third use positions.
Figure 7B:
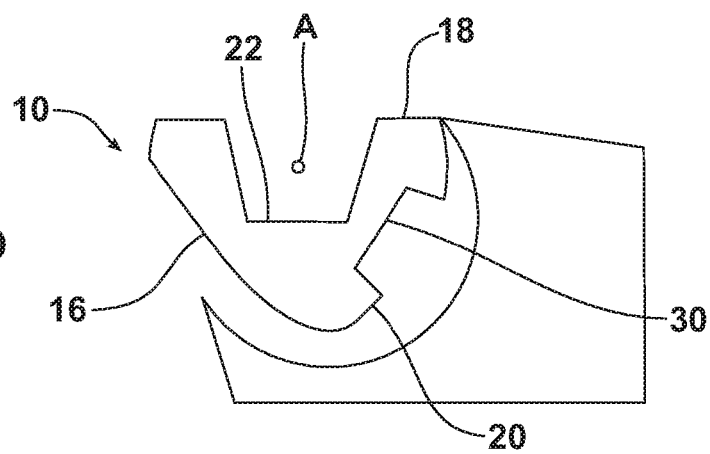
Figure 7C:
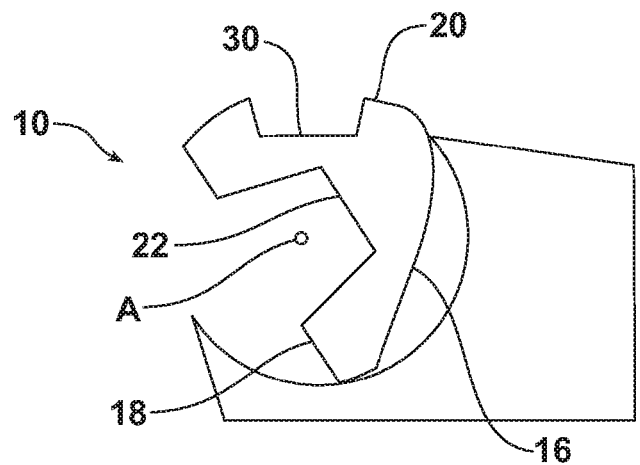

More specifically, the rotating body 12 may be formed or molded from a plastic composite material. In the illustrated embodiment, the rotating body 12 includes a first feature, in the form of a portion of a seat cushion 16, a second feature in the form of a cup holder 18 and a third feature in the form of a storage bin 20. When the rotating body 12 is in a first use position, the seat cushion 16 is oriented upward so as to form a substantially continuous seating surface with the rear seat F (see FIGS. 4 and 7*a*). When the rotating body 12 is in a second use position, the cup holder 18 is oriented upward with two open cup compartments 22 oriented to hold drink cups of vehicle occupants. See FIGS. 5 and 7*b*.

When the rotating body 12 is in a third use position, the storage bin 20 is oriented upward. As illustrated in FIGS. 6*a* and 6*b*, the storage bin 20 includes a lid 24 that is connected by a hinge 26 to the storage bin 20. The lid 24 may be held in a closed position illustrated in FIG. 6*a* by a latch 28 when the rotating body 12 is rotated between use positions so as to maintain objects or items within the storage compartment 30 of the storage bin 20. However, when one desires to gain access to storage compartment 30 one simply releases the snap latch 28 and opens the lid 24 as illustrated in FIG. 6*b*. A simple spring load latch with a push button activator of a type known in the art may be used for the latch 28.

Figure 2:
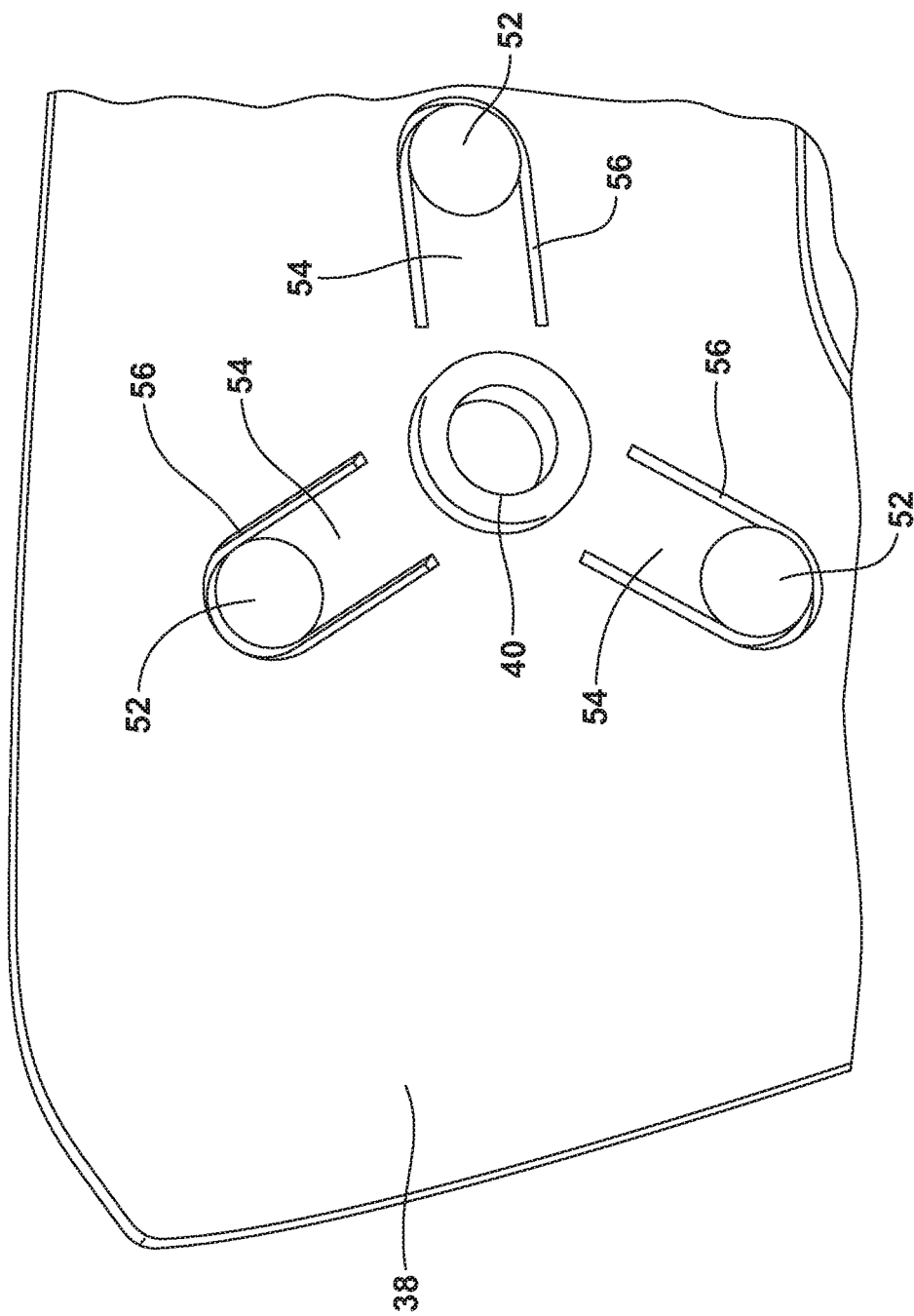
FIG. 2 is a detailed perspective view illustrating the resilient projections in one sidewall of the support base that form a part of the detent mechanism.

As further noted, the body 12 is held in and received for rotation with respect to the support base 14. As best illustrated in FIG. 2, the support base 14 includes a bottom wall 32, a rear wall 34 and two end walls 36, 38. The support base 14 is open at the top and front. Each end wall 36, 38 includes an aperture 40. The two apertures 40 are aligned and form a rotation axis A about which the body 12 rotates.

A detent mechanism, generally designated by reference numeral 50 retains the body 12 in the first, second and third positions illustrated in FIGS. 4, 5 and 6*a*/6*b*. More specifically, as best illustrated in FIG. 2, the detent mechanism 50 includes a series of cooperating resilient projections 52 integrally formed and molded with each end wall 36, 38 of the support base 14. In the illustrated embodiment, three resilient projections 52 are radially oriented and spaced in equal arcs of 120° around the aperture 40 in each of the end walls 36, 38. As illustrated, each projection 52 is carried at the distal end of a resilient arm 54 that is formed in the end wall 36, 38 by the U-shaped slot 56.

Figure 1:
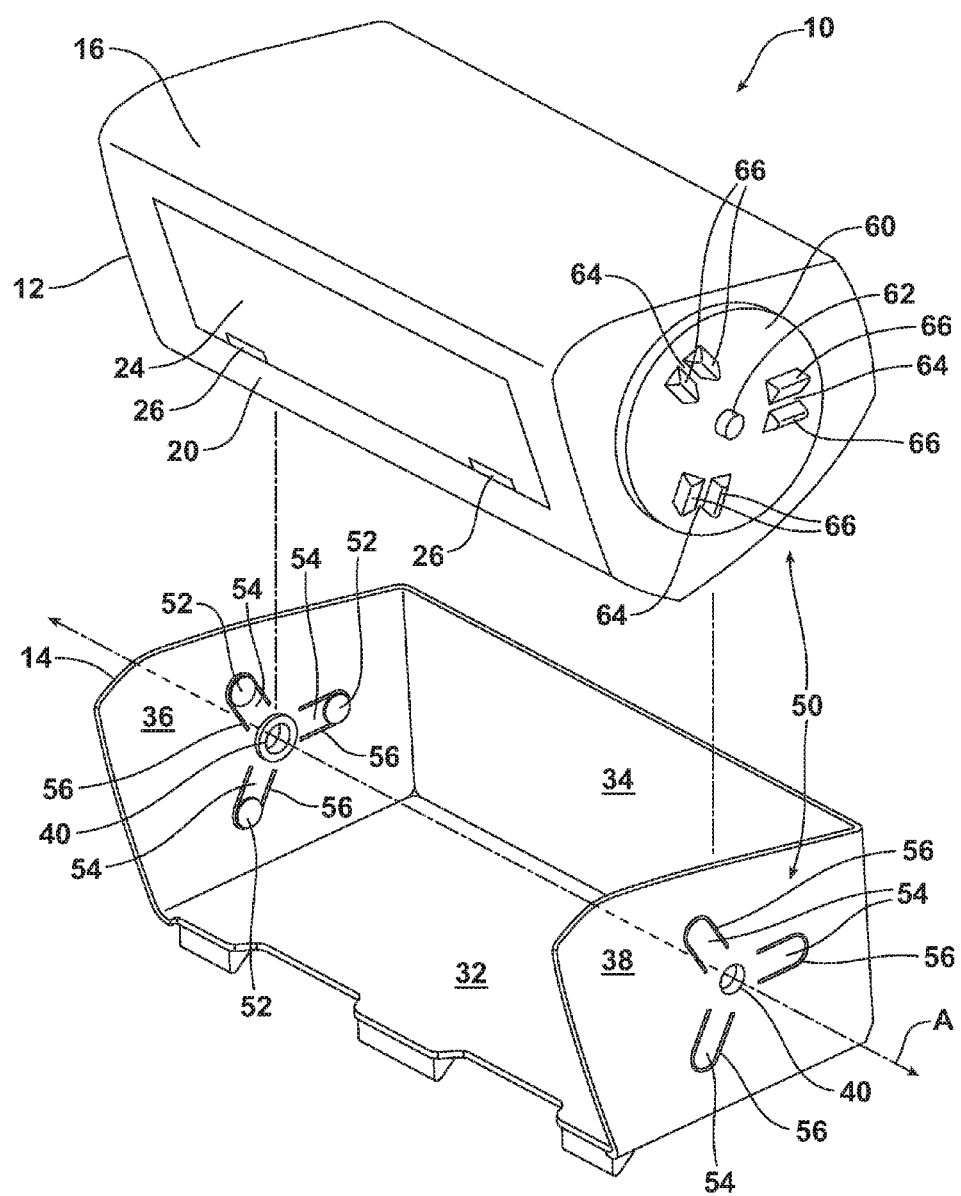
FIG. 1 is an exploded perspective view of the combined cup holder and storage bin including the rotating body and the U-shaped support base.
Figure 3B:
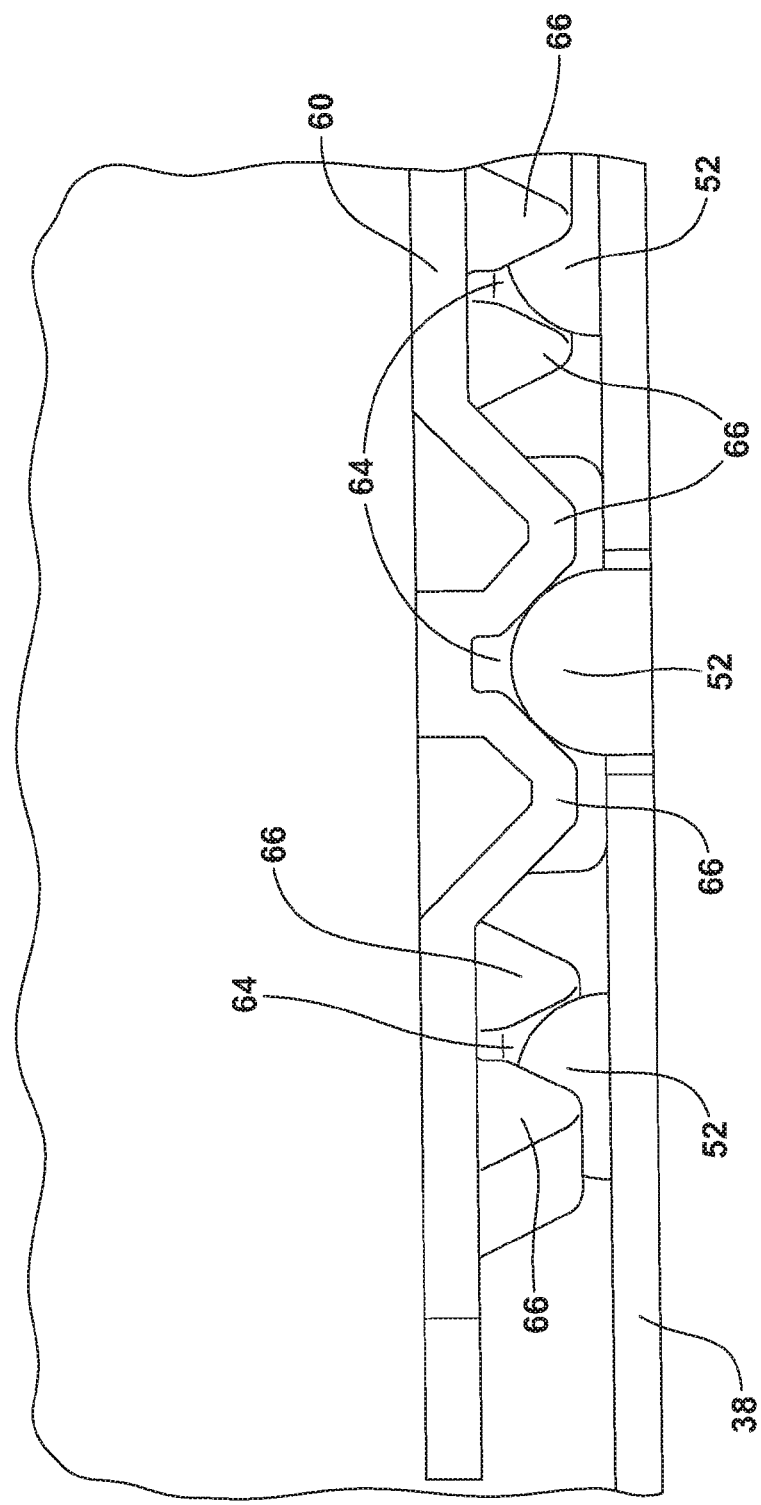
FIG. 3b is a detailed perspective view illustrating the detent mechanism when the rotating body (not shown) is held by the detent mechanism in one of the use positions.

As illustrated in FIG. 1, the rotating body 12 includes a detent plate 60 at each end (only one visible in FIG. 1). Each detent plate 60 includes one stub shaft 62. The stub shafts 62 on the detent plates 60 are aligned with and received in the apertures 40 of the support base 14 so that the body 12 freely rotates about the rotation axis A. Three projection receivers 64 are provided on each detent plate 60. The projection receivers 64 are each formed between a pair of cooperating cams 66 and are radially arrayed around the stub shafts 62 in equal arcs matching the orientation of the resilient projections 52 provided on the end walls 36,38 of the support base 14. Thus, whenever the rotating body 12 is in the first, second or third positions illustrated in FIGS. 4, 5 and 6*a*/6*b*, all of the resilient projections 52 are received and held in the projection receivers 64 at each end of the device 10. As should be appreciated, the engagement of the projections 52 in the receivers 64 tends to maintain and hold the rotating body 12 in the selected first, second or third position. See FIG. 3*b* illustrating the three projections 52 resting between cams 66 in the three cooperating receivers 64. However, whenever a vehicle occupant wishes to displace the rotating body 12 between the first, second and third use positions, he simply engages the rotating body 12 with his hand and rotates the body in the desired direction. This displacement causes the semi-spherical face of the projections 52 to climb the cams 66 thereby forcing the resilient arms 38 to bend outwardly so that the body 12 may be rotated. The projections 52 then float over the detent plates 60 at the ends of the body 12 (see FIG. 3*a*) until the body is rotated into the next use position wherein the projections 36 again climb the cams 66. Once the projections 52 are again aligned with the receivers 64, the resilient arms 38 snap the projections into engagement with the receivers to once again hold the rotating body 12 in the newly selected position.

In summary the combined cup holder and storage bin 10 provides a number of benefits and advantages. More specifically, the bin 10 in the illustrated embodiment includes three separate features 16, 18, 20 that may be selectively oriented for use by a vehicle occupant. These three individual features enhance the versatility and performance of the device 10 so that it is better suited to meet the needs of the user even if those needs include a number of different applications. For example, in the illustrated embodiment, the first feature 14 comprises a portion of a seat cushion while the second feature 16 comprises a cup holder and the third feature 18 comprises a storage bin. Thus, the illustrated embodiment may be oriented in a first position as illustrated in FIG. 4 to expose a portion of a seat cushion. This effectively hides the device from view while also providing an aesthetically pleasing smooth surface that functions as a comfortable seat for a third or center rear seat occupant. In contrast, the rotating body 12 may be rotated into the second use position thereby exposing the cup holder 18 (see FIG. 5) for conveniently holding a cup within reach of any outboard rear seat occupant. Still further, the rotating body 12 may be rotated into the third use position to expose the storage bin 20 into an upward orientation so that one may store and/or access items stored in the bin 20 without having to sacrifice the function of the cup holder 18 for such a purpose.

It should be appreciated that the rotary body 12 may incorporate other features in addition to or instead of the seat cushion 16, cup holder 18 and storage bin 20. For example, these could include an electronic device charging station, a holder that is specifically adapted for holding sunglasses or even a set of dedicated speakers for a portable music device such as an MP3 player.

The foregoing has been presented for purposes of illustration and description. It is not intended to be exhaustive or to limit the embodiments to the precise form disclosed. Obvious modifications and variations are possible in light of the above teachings. For example, while the illustrated embodiment includes detent plates 60 at each end of the body, it should be appreciated that the features 62, 64, 66 may be directly molded into the rotating body 12 if desired. All such modifications and variations are within the scope of the appended claims when interpreted in accordance with the breadth to which they are fairly, legally and equitably entitled.

What is claimed:

1. A combined cup holder and storage bin secured to a rear seat of a motor vehicle, comprising:
   a support base fixed to the rear seat of the motor vehicle; and
   a rotating body received for relative rotation in the support base; said rotating body including a first feature, a second feature and a third feature, said rotating body being selectively displaceable into a first position orienting said first feature for use, a second position orienting said second feature for use and a third position orienting said third feature for use, wherein said first feature comprises a seat cushion that forms a substantially continuous seating surface with the rear seat when said rotating body is in said first position.

2. The combined cup holder and storage bin of claim 1, wherein said rotating body includes a pivot axis and said first feature, said second feature and said third feature are radially oriented about said pivot axis so as to be upwardly facing when said body is in said first position, said second position and said third position.

3. The combined cup holder and storage bin of claim 2, further including a detent mechanism for retaining said body in said first position, said second position and said third position.

4. The combined cup holder and storage bin of claim 3, wherein said detent mechanism comprises cooperating resilient projections and cooperating projection receivers.

5. The combined cup holder and storage bin of claim 4, wherein said resilient projections are provided on said support base.

6. The combined cup holder and storage bin of claim 5, wherein said resilient projections are integrally molded with said support base.

7. The combined cup holder and storage bin of claim 6, further including opposed detent plates on opposite ends of said body, said detent plates including said projection receivers.

8. The combined cup holder and storage bin of claim 6, wherein said second feature comprises a cup holder.

9. The combined cup holder and storage bin of claim 8, wherein said third feature comprises a storage bin.

10. The combined cup holder and storage bin of claim 9, wherein said storage bin has a lid to hold objects in said storage bin as said body is rotated between said first position, said second position and said third position.

11. The combined cup holder and storage bin of claim 1, wherein one of said second feature and said third feature comprises a cup holder.

12. The combined cup holder and storage bin of claim 1, wherein one of said second feature and said third feature comprises a storage bin.

13. The combined cup holder and storage bin of claim 12, wherein said storage bin includes a lid.

14. The combined cup holder and storage bin of claim 1, wherein said second feature is a cup holder and said third feature is a storage bin.

15. The combined cup holder and storage bin of claim 14, wherein said storage bin includes a lid.

16. A combined cup holder and storage bin secured to a rear seat of a motor vehicle, comprising:
a rotating body including a seat cushion, a cup holder and a storage bin, said seat cushion forming a substantially continuous seating surface with the rear seat when in a first position concealing said cup holder and said storage bin from view.

17. A combined cup holder and storage bin secured to a rear seat of a motor vehicle, comprising:
a rotating body including a first feature, a second feature and a third feature, said rotating body being selectively displaceable into a first position orienting said first feature for use, a second position orienting said second feature for use and a third position orienting said third feature for use, wherein said first feature comprises a seat cushion that forms a substantially continuous seating surface with the rear seat when said rotating body is in said first position, wherein said rotating body includes a pivot axis and said first feature, said second feature and said third feature are radially oriented about said pivot axis so as to be upwardly facing when said body is in said first position, said second position and said third position;
a support base fixed to a motor vehicle component, said body rotating in said support base;
a detent mechanism for retaining said body in said first position, said second position and said third position, wherein said detent mechanism comprises cooperating resilient projections and cooperating projection receivers, wherein said resilient projections are integrally molded with said support base, and wherein each of said projection receivers is provided between two cooperating cams; and
opposed detent plates on opposite ends of said body, said detent plates including said projection receivers.

* * * * *